United States Patent [19]
Albrecht

[11] Patent Number: 5,139,041
[45] Date of Patent: Aug. 18, 1992

[54] STOP AND LOCK PLATE FOR USE WITH VALVE

[76] Inventor: David E. Albrecht, 1383 Granary Rd., Blue Bell, Pa. 19422

[21] Appl. No.: 825,924

[22] Filed: Jan. 27, 1992

[51] Int. Cl.⁵ .................................. F16K 35/00
[52] U.S. Cl. ................................ 137/15; 137/385; 251/93; 70/180
[58] Field of Search ............ 137/385, 15; 70/179, 70/180; 251/93

[56] References Cited

U.S. PATENT DOCUMENTS

| | | | |
|---|---|---|---|
| 2,399,578 | 4/1946 | Smith | 137/385 |
| 4,162,690 | 7/1979 | Anderson | 137/385 |
| 4,534,379 | 8/1985 | Burge | 137/385 |
| 4,852,610 | 8/1989 | McHugh | 137/385 |
| 4,909,275 | 3/1990 | Massey et al. | 137/385 |
| 5,014,528 | 5/1991 | Roberts | 137/385 |
| 5,052,655 | 10/1991 | Ackroyd | 137/385 |

*Primary Examiner*—A. Michael Chambers
*Attorney, Agent, or Firm*—Frank A. Follmer

[57] ABSTRACT

A valve having a rotatable valve stem for positioning the valve in open and closed positions is provided with a plate which is cooperable with a valve handle for both stopping the handle in either of the valve open or valve closed positions and for locking the handle in said positions by means of a padlock.

8 Claims, 4 Drawing Sheets

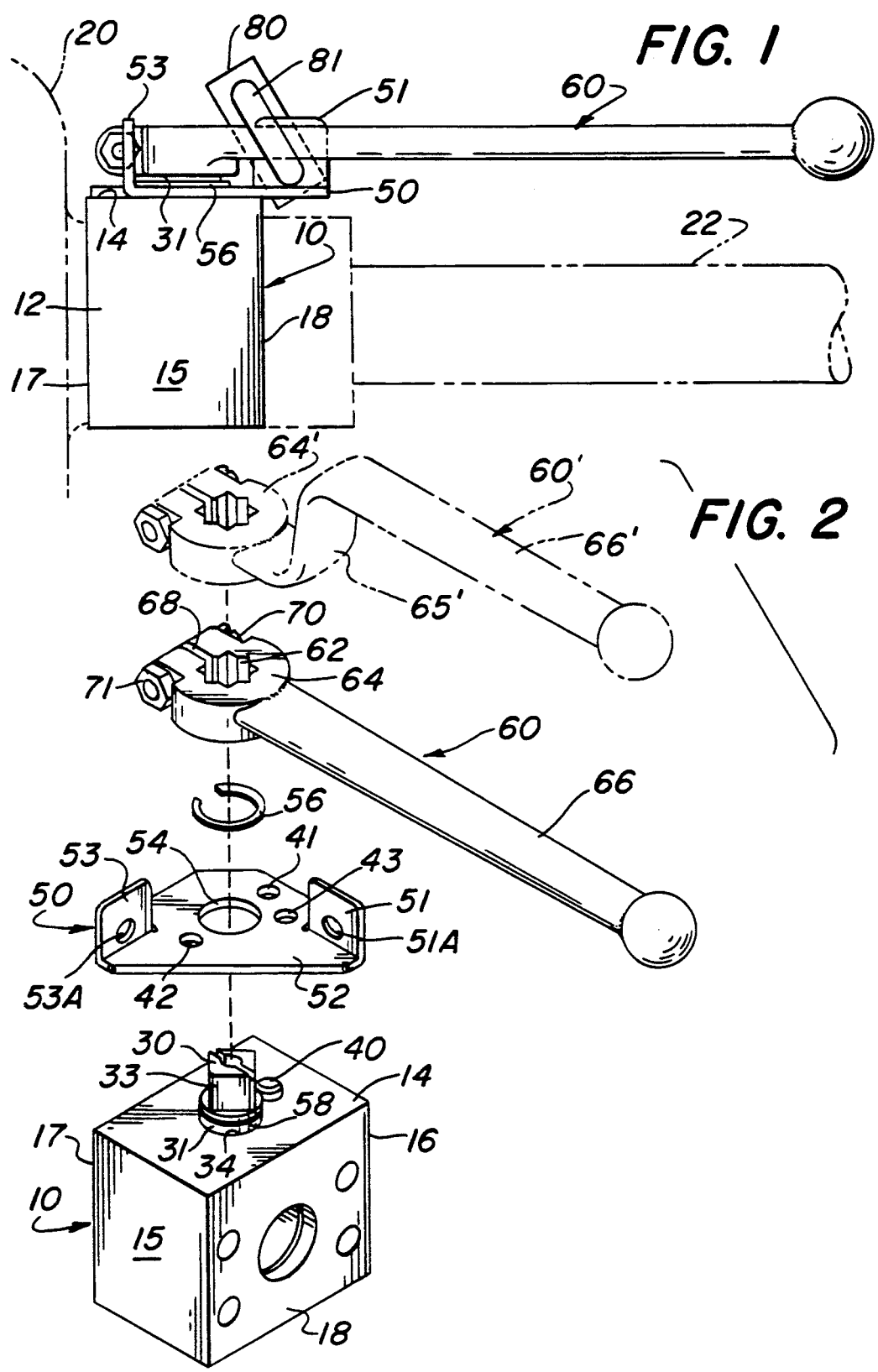

STOP AND LOCK PLATE FOR USE WITH VALVE

BACKGROUND AND SUMMARY OF THE INVENTION

This invention relates generally to flow control valves of the type having a rotatable valve stem extending from a valve member movable between a pair of flow control positions, and, more particularly, to means for stopping the valve stem at either of said flow control positions and for locking the same in the stopped position thereof.

Many types of flow control valves, such as ball valves and butterfly valves, have a valve member mounted for rotation between a pair of extreme flow control positions, such as a closed position and a fully open position. Typically, the valve member is provided with a valve stem extending from the valve member to project from an outer wall of the valve body for connection with a handle. Such valves are often provided with a stop means cooperable with the valve stem to limit the rotation thereof between the two extreme flow control positions. There is also a need in the art to lock the valves of the indicated type in either their closed or open position depending on the particular application. This is a common requirement of OSHA which often requires that if work is to be performed on a particular flow line, the valve controlling flow through said line must be locked in a designated position. The locking devices in use today are very complicated and require a substantial installation time.

It is the general object of the present invention to provide means for use with a valve means of the indicated type for cooperating with a handle secured on the valve stem to provide a stop therefor at two extreme flow control positions to which the valve stem can be rotated as well as means to provide for the locking of the handle in either of said flow control positions.

Briefly stated, in accordance with the invention there is provided a valve, which includes a valve body provided with a flat outer wall, a valve member rotatably mounted within said valve body for movement between two extreme flow control positions and a valve stem extending from the valve member through the outer wall to project therefrom, with means for both stopping and locking a handle attached to the valve stem when said valve stem is in either of said two flow control positions. To this end, a pin is mounted on the valve body to project from the outer wall thereof at a location spaced apart from the valve stem. A plate having a flat portion adapted to be supported on the outer wall is provided, the plate having formed therein a first hole adapted to have the valve stem extend therethrough and a plurality of positioning holes adapted to have the pin extend therewithin. The holes in the plate are constructed and arranged to permit the plate to be set in a located position with the flat portion supported on the outer wall of the valve body, with the valve stem extending through the first hole and with the pin extending within one of said positioning holes. A retainer is provided for holding the plate in its supported position on the outer wall of the valve body. The plate is also provided with a pair of ears projecting from the flat portion thereof at spaced apart locations. There is provided a handle adapted to be secured on the valve stem at a location outwardly of the plate and having a portion extending in a radial direction from the longitudinal axis of the valve stem. The ears are constructed and arranged to provide a pair of stops that come into contact with the handle portion to limit movement thereof at two spaced apart locations corresponding to said extreme flow control positions of the valve member. Furthermore, each of the ears is provided with a hole therein located out of alignment with the handle portion when the handle is in its stopped position, each of said ears being adapted to have the U-shaped bar of a padlock passed therethrough so that the handle can be secured in a fixed relation relative to said ears by means of a padlock.

BRIEF DESCRIPTION OF THE DRAWINGS

FIG. 1 is a side elevational view of a preferred embodiment of a valve means in accordance with the invention.

FIG. 2 is an exploded view of the valve means shown in FIG. 1.

DETAILED DESCRIPTION OF THE PREFERRED EMBODIMENT

Figure 3:
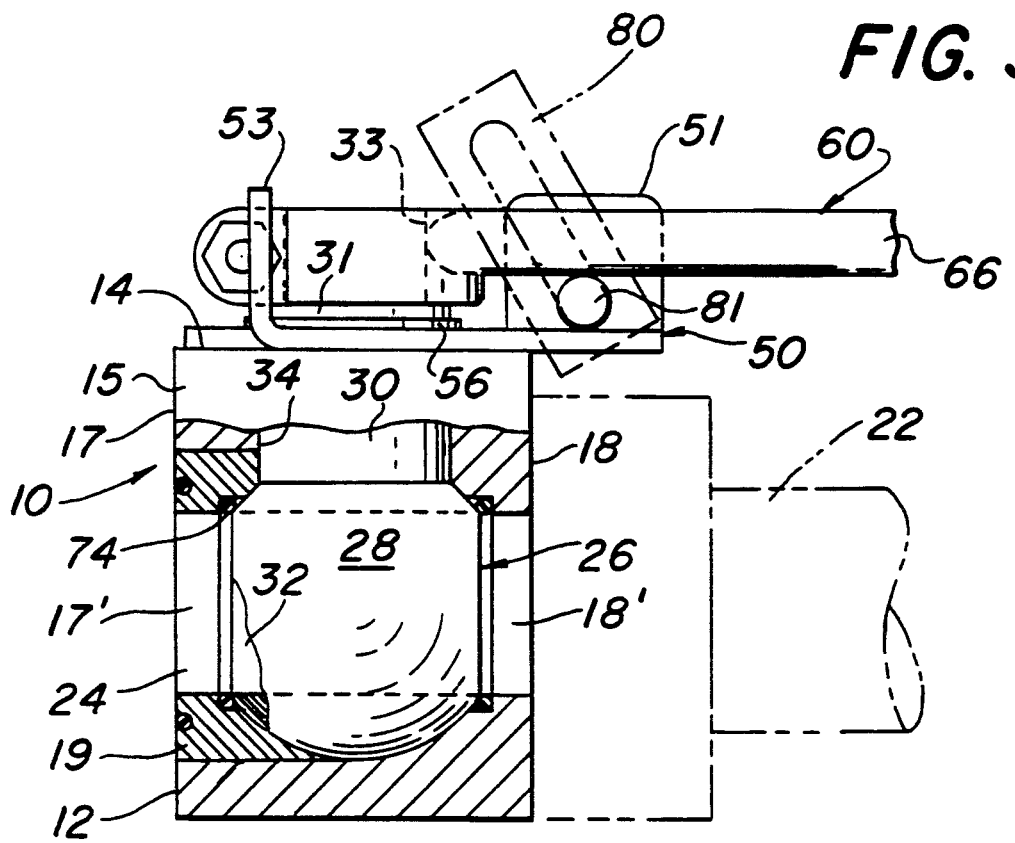
FIG. 3 is a side elevational view of the valve means shown in FIG. 1 partially broken away to illustrate details of construction.

In FIGS. 1 to 4 of the drawings, there is shown an embodiment of the invention comprising a ball valve 10, which includes a generally box-shaped valve body 12 having a flat top wall 14, a pair of side walls 15 and 16 and a pair of end walls 17 and 18. Valve 10 is shown in FIG. 1 in a conventional arrangement for controlling the discharge flow from a fluid flow component 20 to a delivery line 22. As is conventional, the valve body 12 defines an internal valve chamber 24 adapted to house a generally ball-shaped valve member 26. Valve member 26 is made of a ball and stem construction comprising a ball member 28 and a valve stem 30. The ball member 28 has a truncated hollow spherical configuration and includes a cylindrical internal flow passage 32 extending horizontally and adapted to be axially aligned with flow passages 17' and 18' arranged to extend horizontally inwardly from ends 17 and 18, respectively, of the valve body 12.

Valve member 26 is arranged to rotate about a vertical axis and to this end, ball portion 28 is rotatably supported in a spherical portion of the valve chamber 24 and valve stem 30 is rotatably supported within a cylindrical bore 34 in the upper portion of the valve body 12 extending vertically downwardly from the top wall 14. The valve stem 30 of the valve member 26 extends through the top wall 14 to project upwardly therefrom. By this arrangement, the valve stem 30 is mounted for rotation about its vertical and longitudinal axis.

The portion of the valve stem 30 projecting above the top wall 14 comprises a cylindrical portion 31 immediately adjacent the top wall 14 and a square-shaped portion 33 at the upper end portion of the valve stem 30.

Figure 4:
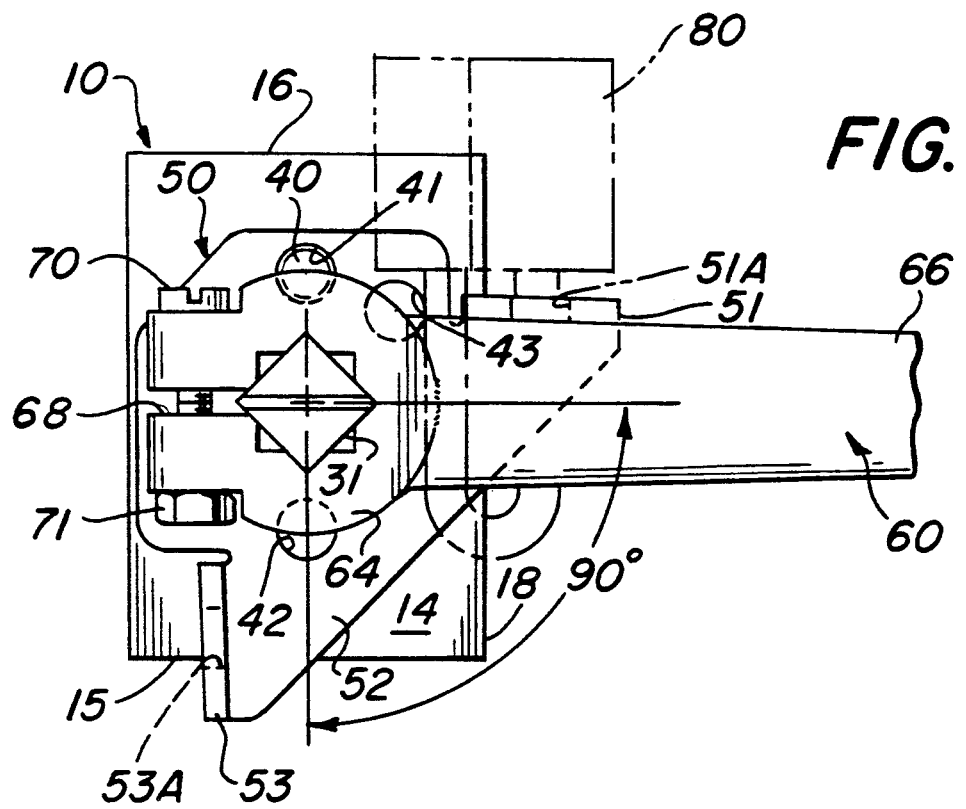
FIG. 4 is a top plan view of FIG. 3.

A pin 40 is mounted in the valve body 12 to project upwardly from the top wall 14 at a location spaced apart from the valve stem 30, the location of the pin 40 being best illustrated in FIGS. 2 and 4.

Pursuant to the invention, there is provided a specially constructed combination stop and lock plate 50, the shape of which is best illustrated in FIG. 2. The plate 50 has a flat portion 52, which has a generally centrally located first hole 54 therein adapted to have valve stem 30 extend therethrough to project therebeyond. As is best shown in FIG. 2, hole 54 is the same size as stem portion 31 whereby hole 54 is adapted to fit snuggly on the valve stem 30 while permitting relative rotational movement between the valve stem 30 and the plate 50.

The flat portion 52 of plate 50 is also provided with three positioning holes 41, 42, 43 of a size adapted to have the pin 40 extended therewithin for use in positioning plate 50 on top of the valve body 12. The parts are constructed and arranged so that the positioning holes 41, 42, 43 in the flat portion 52 of plate 50 function to permit plate 50 to be set in three located positions wherein the flat portion 52 is supported on the outer wall of the top wall 14 of the valve body 12 with the valve stem 30 extending through said first hole 54 and the pin 41 extending within one of the positioning holes 41, 42, or 43.

A retainer is provided for holding plate 50 in its set locked position supported on top wall 14 of valve body 12 and engaged with the pin 40. The retainer 56 is a conventional flat ring type which is received by spring action in a circular recess 58 formed in the valve stem 30 at a location spaced above top wall 14 an amount to locate the secured retainer 56 immediately above the flat portion 52 of plate 50 to thereby hold plate 50 against movement away from the top wall 14 of the valve body 12.

A handle 60 is provided for rotating the valve member 26 between open and closed positions. The handle 60 is of a conventional construction and comprises a hole 62 in a generally annular mounting portion 64 at one end thereof and an elongated portion 66 extending from the mounting portion 64 a substantial distance so as to be gripped by the hand of an operator during use. The hole 62 is in the shape of an eight-point star adapted to receive the square-shaped upper end 33 of the valve stem 30 in eight different angularly rotated positions as is conventional in the art. The handle 60 has a slot 68 in the mounting portion 64 extending from the end thereof into the hole 62 to thereby provide a bifurcated clamp means which has a mounting bolt 70 received in a pair of legs in a conventional arrangement whereby the bolt 70 is held in one bifurcated leg and extends through the other leg to be engaged with a nut 71. By this arrangement, as the nut 71 is tightened onto the extended end of the bolt 70, the bifurcated legs are drawn together and cause the mounting portion 64 of the handle 60 to securely engage the square end 33 of the valve stem 30.

Plate 50 is provided with a pair of ears 51 and 53 projecting upwardly from the flat portion 52 at spaced apart locations as shown in the drawings. The ears 51 and 53 are constructed and arranged to provide a pair of stops that come into contact with the handle 60 secured on the valve stem 30 to limit the movement thereof at two spaced apart stopped positions. The parts are constructed and arranged such that the handle may be rotated through a ninety degree movement, as illustrated in FIG. 4, with the valve member 26 being moved between a fully open position, as shown in FIG. 3, and a fully closed position wherein the passage 32 within the valve member 26 extends at right angles to the position shown in FIG. 3. In the fully closed position, the spherical ball portion 28 of the valve member 26 cooperates with the valve seat 74 held in place by insert 19 to block flow through the valve body 12. Referring to FIG. 3, the valve body 12 is provided with an outlet flow passage 18' which is located adjacent at one end of the valve chamber 24 in alignment with an inlet flow passage 17' formed in insert 19 to be located at other end of the valve chamber 24, which construction is conventional.

In accordance with the invention, means are provided to provide for the locking of the handle 60 in either of its two stopped positions corresponding to the open and closed position of valve 10. To this end, the ears 51 and 53 are provided with holes 51A and 53A, respectively, as is best shown in FIG. 2. Each of the holes 51A and 53A is adapted to have a U-shaped bar 81 of a padlock 80 pass therethrough so that the handle 60 can be secured in relation to an associated ear 51 and 53 by means of a padlock 80 as is shown in FIGS. 1 and 3. To this end, the holes 51A and 53A are located so that when the handle portion 66 of handle 60 is positioned at a stopped position thereof by an associated ear 51 and 53, respectively, said hole is out of alignment with said handle portion 66, i.e., the handle portion 66 will not obstruct the insertion of the U-shaped bar 81 of a padlock 80 whereby the handle 60 can be secured in a locked position by means of a padlock 80.

Figure 5:
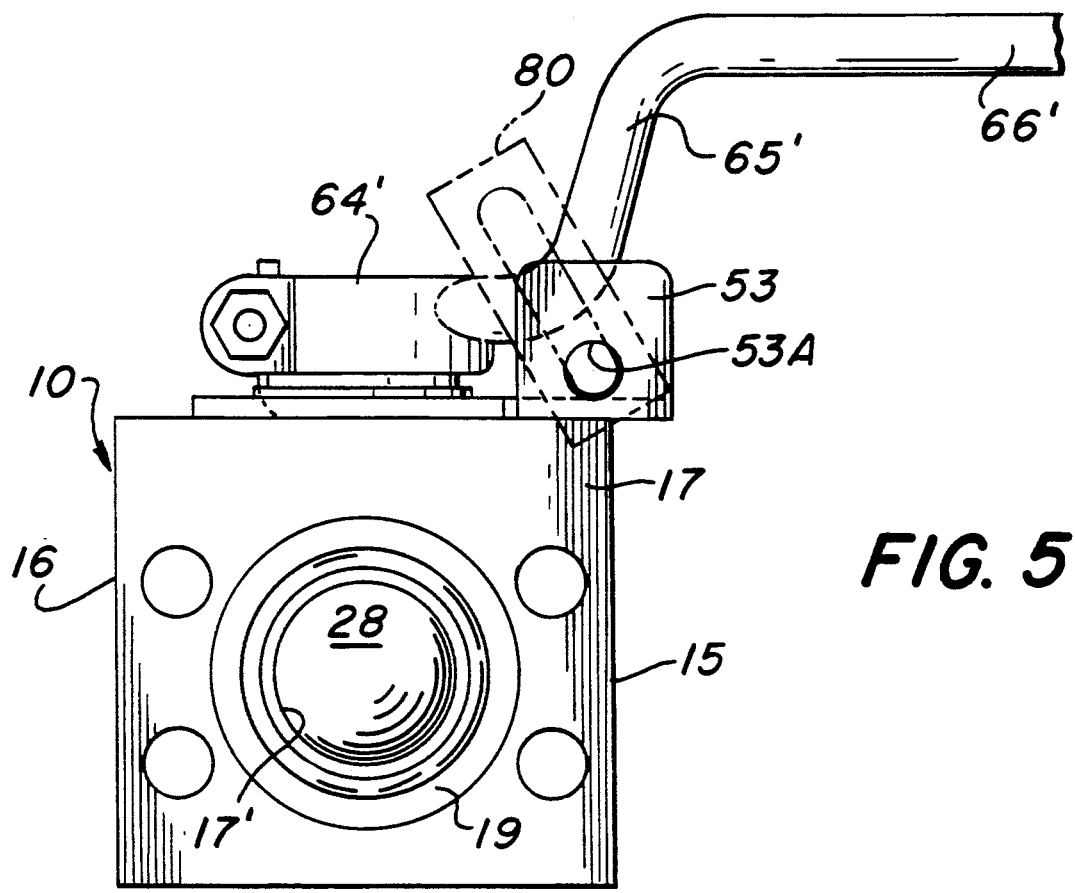
FIG. 5 is a front elevational view of a valve means in accordance with the invention having another type of valve handle.
Figure 6:
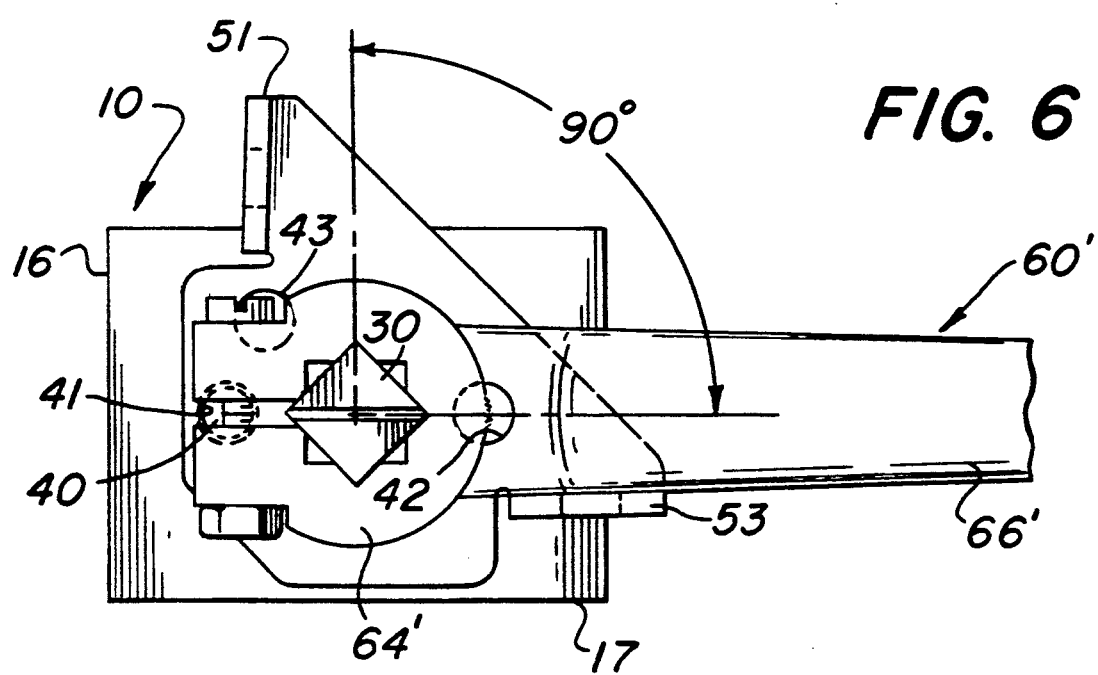
FIG. 6 is a top plan view of FIG. 5.

FIGS. 5 and 6 illustrate an alternative embodiment of the invention wherein another type of handle 60' (shown in dashed lines in FIG. 2) is used to actuate the valve stem 30. In this embodiment, the handle 60' has an off-set configuration comprising a bent medial portion 65' located between a mounting portion 64' and a elongated handle portion 66'. By this construction, handle portion 66' extends from the valve body 12 at a higher elevation than handle 60. Handles 60 and 60' are of the same construction except for the medial portion 65' of handle 60'.

In FIGS. 5 and 6, there is also shown the alternate arrangement wherein the handle 60' is locked in the other stopped position in engagement with the ear 53.

Figure 7:
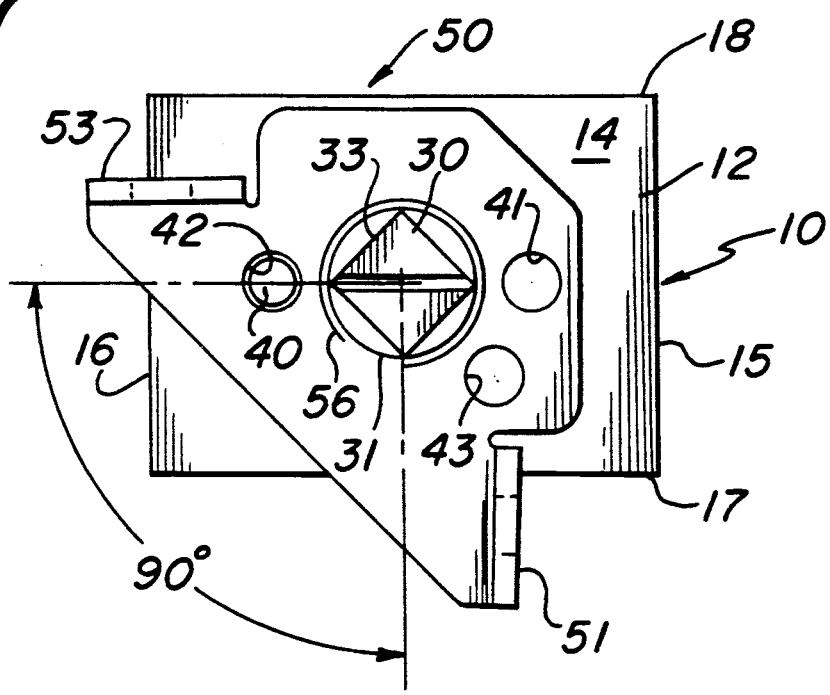
FIGS. 7 and 8 are top plan views of the valve means in accordance with the invention illustrating alternate positions of the combination stop and lock plate.

FIG. 7 illustrates an alternate of the invention wherein the plate 50 is mounted in a set position at 180 degrees from that shown in FIGS. 1 to 4. In this position, the pin 40 is engaged in the positioning hole 42 that is on the opposite side of the central hole 54 from hole 41 and on a line extending through the axis of rotation of the valve stem 30 and through the center of positioning holes 41 and 42. By this arrangement, the handle 60 can be operated from the opposite side of the valve body 12 from that shown in the embodiment of FIGS. 1 to 4.

Figure 8:
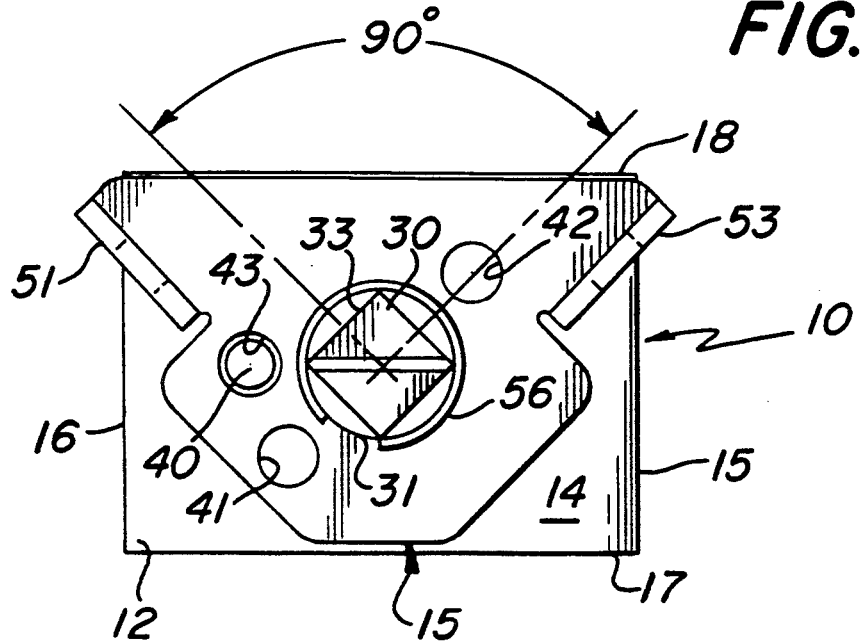

In FIG. 8, a third set position of the plate 50 is illustrated. In this position, the pin 40 is engaged within the third positioning hole 43 in the flat portion 52 of the plate 50. It is noted that the third positioning hole 43 is located on a line at 45 degrees of angular rotation with respect to the positioning hole 41, the center of rotation being the center of the central hole 54 which center is coincident with the axis of rotation of the valve stem 30. In this arrangement of the plate 50, the handle 60 can be operated throughout its ninety degrees of rotation with the handle 60 rotating at forty-five degrees on both sides of center of the flow line through the valve 10.

It will thus be apparent from a consideration of the arrangement shown in FIGS. 4, 7, and 8 that the handle 60 can be positioned to operate at three convenient orientations around the axis of rotation of the valve stem 30. Further, it will be apparent that the combination stop and lock plate 50 is extremely simple in construction but permits the operation of the valve 10 whereby the valve handle 60 can be both stopped in two extreme positions and locked in said positions by means of a padlock. Further, the plate 50 is designed so that is can work with either a straight handle 60 or an offset handle 60' and said handles 60 and 60' can be locked by means of a conventional padlock as discussed above and as shown in the drawings.

The method by which the valve 10 is adapted to be both stopped and locked in one of its two extreme flow control positions by the use of the combination stop and lock plate 50, the retainer 56, the handle 60, and the padlock 80 will now be described.

The initial step is to determine which of the three positions of the plate shown in FIGS. 6, 7, and 8 best suits the particular application where the valve 10 is to be installed. When the desired orientation of plate 50 is selected, the valve 10 is in the condition as shown in FIG. 2 with the valve stem 30 extending from the top wall 14 without any parts assembled thereon. Briefly, the method involves the sequential assembly of the plate 50, the retainer 56, and the handle 60 onto the projecting end of the valve stem 30, and then the padlock 80 is attached.

The plate 50 is mounted on the valve 10 by sliding the hole 54 onto the valve stem 30 until it rests on the top wall 14 of the valve body 12 with stem portion 31 contained within hole 54. At the same time, the pin 40 is engaged within the selected one of the positioning holes 41, 42, or 43 to thereby lock the plate 50 in a said position supported on top wall 15 and against rotation.

The next step is to assemble the retainer 56 in engagement with the circular recess 58 in portion 31 of valve stem 30. The installation of the retainer 56 serves to hold plate 50 in its supported position on outer wall 14 of valve body 12 to prevent movement thereof away from said outer wall 14.

The next step is to mount the handle 60 onto the square portion 33 of the valve stem 30 in a position as shown in FIG. 3, for example. In assembling the handle 60 onto the square portion 33, it is important to coordinate the extending position of the handle 60 (which can be mounted on portion 33 at eight different angular positions) with the position of the valve stem 30 and valve member 26 relative to the flow passages through the valve 10. Thus, with plate 50 in the position shown in FIGS. 3 and 4, the handle 60 must extend in alignment with the flow passage 17' and 18' when the valve member 26 is in valve open position. By this arrangement, the handle 60 will be oriented to be stopped by either ear 51 in an open position or by ear 53 in a valve closed position.

The next step is to position the valve handle 60 with its valve portion 66 in a stopped position against one of the ears 51 or 53 and to install a padlock 80 in position to lock the handle 60 in said stopped position. The padlock 80 is installed by extending a straight leg portion of its U-shaped bar 81 through the hole 51A or 53A of the associated ear 51 or 53 while enclosing the handle portion 66 with the remainder of the U-shaped bar, which is then secured in a locked position as is conventional in the use of a padlock.

What is claimed is:

1. A method of both stopping and locking a valve in one of its two extreme flow control positions by the use of a combination stop and lock plate, a retaining means, a valve handle, and a padlock, wherein said valve includes a valve body having a flat outer wall, a valve member rotatably mounted within said valve body for movement between a plurality of flow control positions, a valve stem rotatable with and extending from said valve member through said outer wall to project therefrom, said valve stem being mounted for rotation about its longitudinal axis, and a pin mounted in said valve body to project from said outer wall thereof at a location spaced apart from said valve stem, wherein said plate has a flat portion adapted to be supported on said outer wall, said flat portion of said plate having a first hole therein adapted to have said valve stem extend therethrough and project therebeyond and a plurality of positioning holes therein adapted to have said pin extend therewithin for positioning said plate, said holes in said flat portion of said plate being constructed and arranged to permit said plate to be set in a located position with the flat portion thereof supported on said outer wall of said valve body and with said valve stem extending through said first hole and said pin extending within one of said positioning holes, said plate having a pair of ears projecting from said flat portion thereof at spaced apart locations, wherein said retainer is constructed and arranged for holding said plate in its supported position on the outer wall of said valve body, and wherein said handle is constructed and arranged for use in rotating said valve member between said flow control positions and has a mounting portion adapted to be secured on said valve stem at a location outwardly of said plate and a second portion extending radially from said longitudinal axis of said valve stem, said ears being constructed and arranged to provide a pair of stops that come into contact with said second portion of said handle to limit the movement thereof at two spaced apart stopped positions, said ears each having a hole therein located out of alignment with said second handle portion is in a stopped position, each of said holes being adapted to have a U-shaped bar of a padlock passed therethrough so that said handle can be secured in relation to an associated ear by means of a padlock, said method comprising the sequential steps of mounting said plate on the valve by sliding the first hole thereof onto said valve stem until the flat portion of said plate rests on the top wall of the valve and, at the same time, having said pin engaged within one of said positioning holes to thereby lock said plate in said supported position and against rotation, installing said retaining means in position to hold said plate in its supported position on said outer wall of valve body, mounting said handle on the upper end of said valve stem above said plate in a position so that when said handle is in a stopped position against one of said ears, said valve is in one of its extreme flow control positions, and inserting the U-shaped bar of a padlock through said hole of said associated ear so that said handle is secured in relation to said associated ear by means of said padlock.

2. For use with a valve body having a flat outer wall, a valve member rotatably mounted within said valve body for movement between a plurality of flow control positions, and a valve stem rotatable with and extending from said valve member through said outer wall to project therefrom, said valve stem being mounted for rotation about its longitudinal axis, the combination comprising a pin adapted to be mounted in said valve body at a location spaced apart from said valve stem, a plate having a flat portion adapted to be supported on said outer wall, said flat portion of said plate having a first hole therein adapted to have said valve stem extend therethrough and project therebeyond, and at least one positioning hole therein adapted to have said pin extended therewithin for positioning said plate, said holes in said flat portion of said plate being constructed and arranged to permit said plate to be set in a located position with the flat portion thereof supported on said outer wall of said valve body and with said valve stem extending through said first hole and said pin extending within said positioning hole, said plate having a pair of ears projecting from said flat portion thereof at spaced apart locations, and a handle for use in rotating said valve member between said flow control positions having a mounting portion adapted to be secured on said valve stem at a location outwardly of said plate and having a second portion extending radially from said longitudinal axis of said valve stem, said ears being constructed and arranged to provide a pair of stops that come into contact with said second portion of said handle to limit the movement thereof at two spaced apart stopped positions.

3. The combination according to claim 2 wherein said ears each have a hole therein located out of alignment with said second handle portion when said handle is in a stopped position, each of said holes being adapted to have a hinged bar of a padlock passed therethrough so that said handle can be secured in relation to an associated ear by means of a padlock.

4. For use with a valve including a valve body having a flat outer wall, a valve member rotatably mounted within said valve body for movement between a plurality of flow control positions, and a valve stem rotatable with and extending from said valve member through said outer wall to project therefrom, said valve stem being mounted for rotation about its longitudinal axis, the combination comprising a pin mounted in said valve body to project from said outer wall thereof at a location spaced apart from said valve stem, a plate having a flat portion adapted to be supported on said outer wall, said flat portion of said plate having a first hole therein adapted to have said valve stem extend therethrough and project therebeyond, and a plurality of positioning holes therein adapted to have said pin extended therewithin for positioning said plate, said holes in said flat portion of said plate being constructed and arranged to permit said plate to be set in a located position with the flat portion thereof supported on said outer wall of said valve body and with said valve stem extending through said first hole and said pin extending within one of said positioning holes, said plate having a pair of ears projecting from said flat portion thereof at spaced apart locations, and a handle for use in rotating said valve member between said flow control positions having a mounting portion adapted to be secured on said valve stem at a location outwardly of said plate and having a second portion extending radially from said longitudinal axis of said valve stem, said ears being constructed and arranged to provide a pair of stops that come into contact with said second portion of said handle to limit the movement thereof at two spaced apart stopped positions.

5. The combination according to claim 4 wherein said ears each have a hole therein located out of alignment with said second handle portion when said handle is in a stopped position, each of said holes being adapted to have a U-shaped bar of a padlock passed therethrough so that said handle can be secured in relation to an associated ear by means of a padlock.

6. The combination according to claim 4 including a retainer for holding said plate in its supported position on said outer wall of said valve body.

7. The combination according to claim 6 wherein said retainer comprises a ring in engagement with said valve stem at a location outwardly of said flat portion of said plate and adapted to overly said flat portion to prevent movement thereof away from said outer wall.

8. The combination according to claim 4 wherein there are at least three positioning holes for positioning said plate in at least three different positions.

* * * * *